United States Patent
Kato

(10) Patent No.: US 10,761,790 B2
(45) Date of Patent: Sep. 1, 2020

(54) INFORMATION PROCESSING APPRATUS, METHOD, AND STORAGE MEDIUM

(71) Applicant: CANON KABUSHIKI KAISHA, Tokyo (JP)

(72) Inventor: Hisashi Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/867,907

(22) Filed: Jan. 11, 2018

(65) Prior Publication Data

US 2018/0210684 A1 Jul. 26, 2018

(30) Foreign Application Priority Data

Jan. 26, 2017 (JP) .................... 2017-012337

(51) Int. Cl.
*G06F 3/12* (2006.01)
(52) U.S. Cl.
CPC .......... *G06F 3/1225* (2013.01); *G06F 3/1204* (2013.01); *G06F 3/1206* (2013.01); *G06F 3/1226* (2013.01); *G06F 3/1232* (2013.01); *G06F 3/1292* (2013.01)
(58) Field of Classification Search
USPC ....................................... 358/1.15
See application file for complete search history.

(56) References Cited

U.S. PATENT DOCUMENTS 7,325,235 B2   1/2008   Iida et al.
7,903,272 B2   3/2011   Kato
8,300,238 B2  10/2012   Kato
9,612,783 B2   4/2017   Kato
9,753,683 B2   9/2017   Oonami
(Continued)

FOREIGN PATENT DOCUMENTS

JP        2015-191645 A      11/2015

OTHER PUBLICATIONS

Stoshi et al.; System for Supporting Use of Device on Network; Jul. 20, 2006; Machine Translated Japanese Patent Application Publication; JP2006190320; All Pages.*

(Continued)

*Primary Examiner* — Frantz Bataille
(74) *Attorney, Agent, or Firm* — Venable LLP

(57) ABSTRACT

An information processing apparatus executes an operating system (OS) including a printing system that supports a first search protocol, and a printing function to generate a print job conforming to a first printing method and send the generated print job to a printer as a standard. A memory stores instructions, and a processor executes the instructions causing the information processing apparatus to receive a message conforming to the first search protocol from another printer that has been newly detected via the first search protocol if instructions for the use of the printing system included in the OS are provided by a user, and activate, upon condition that the detected printer has been selected and is determined not to conform to the first printing method based on contents of the received message, a function for downloading a print plug-in that supports the detected printer, wherein the print plug-in generates another print job and sends the generated another print job to the detected printer.

20 Claims, 15 Drawing Sheets

(56) References Cited

U.S. PATENT DOCUMENTS

| | | | | |
|---|---|---|---|---|
| 2002/0051200 | A1* | 5/2002 | Chang | G06Q 20/405 |
| | | | | 358/1.15 |
| 2010/0315662 | A1* | 12/2010 | Fukunishi | G06F 3/1205 |
| | | | | 358/1.9 |
| 2013/0250359 | A1* | 9/2013 | Hasegawa | G06K 15/007 |
| | | | | 358/1.15 |
| 2016/0026416 | A1* | 1/2016 | Kikuchi | G06F 3/1226 |
| | | | | 358/1.15 |
| 2016/0224284 | A1* | 8/2016 | Fernandes | G06F 3/1231 |
| 2016/0344879 | A1* | 11/2016 | Panda | G06F 3/12 |

OTHER PUBLICATIONS

Stoshi et al.; System for Supporting Use of Device on Network; Jul. 20, 2006; Machine Translated Japanese Patent Application Publication; JP2006190320; All Pages (Year: 2006).*

* cited by examiner

FIG. 4

| Vendor name | Package name | Download site |
|---|---|---|
| ABC | jp.co.abc.xxxxx | https://store.abc.printplugin |
| EFG | jp.co.efg.xxxxx | https://store.efg.printplugin |
| HIJ | com.hij.xxxxx | https://store.hij.printplugin |
| XYZ | com.xyz.xxxxx | https://store.xyz.printplugin |

FIG. 9

| Model name | IP address | Notification source | Support of standard printing | Vendor | Plug-in |
|---|---|---|---|---|---|
| Printer-A | 192.168.0.10 | Standard search | ○ | ABC | Not installed |
| Printer-B | 192.168.0.11 | Standard search | × | ABC | Not installed |
| Printer-C | 192.168.0.12 | Standard search | × | EFG | Installed |
| Printer-D | 192.168.0.12 | jp.co.efg.xxxxx | NA | EFG | NA |

INFORMATION PROCESSING APPRATUS, METHOD, AND STORAGE MEDIUM

BACKGROUND OF THE INVENTION

Field of the Invention

The present invention relates to an information processing apparatus, a method, and a storage medium.

Description of the Related Art

In recent years, mobile terminal devices such as smartphones typified by "Android" (registered trademark) have come to support a printing function by the operating system (OS) as a standard. Software that controls the printing function in a personal computer typified by "Windows" (registered trademark) is a printer driver. In Android, software referred to as "print plug-in" is used instead of the printer driver.

The print plug-in includes a search function and a printing function, presents a list of printers that have been detected by using the search function in response to requests from each application of the mobile terminal device, and transmits a print job to the printer selected by the user. The print plug-in is provided to a user from a printer vendor or an application vendor via an application distribution service such as "Google Play" (registered trademark).

In order for the user to use the function of the print plug-in, it is necessary to download and install the print plug-in. In the initial state of the mobile terminal device, the print plug-in is not installed in the mobile terminal device, so that the user of the mobile terminal device cannot perform printing.

Accordingly, minimal printing is possible even in the initial state of the mobile terminal device, for example, by providing the standard search function and the standard printing function in the OS of the mobile terminal device in advance. Japanese Patent Application Laid-Open No. 2015-191645 discloses a printing system that realizes a printing function unique to a printing apparatus that is valid only for documents to be printed in an OS in which only the standard printer driver attached to the OS can be used.

The mobile terminal device provided with the standard search function and the standard printing function in advance is limited to specific standard techniques, thereby increasing the number of printers supporting (compatible with) the mobile terminal device at low cost. As an example of the specific standard techniques, there are "Bonjour" as a search protocol, "PWG-Raster" as a printing format, and "IPP (Internet Printing Protocol)" as a communication protocol for data transmission.

However, some printers may not support all standard techniques. For example, some printers do not support PWG-Raster as a printing format even if they support the search by Bonjour. In this case, even if the printer plug-in is not installed in the mobile terminal device, the printer is detected by the standard search function of the mobile terminal device.

Accordingly, in the mobile terminal device, the printer is displayed on the list of printers as a printer to be used. However, even if the printer is selected from among the list of printers, the printer does not support the standard printing format. Consequently, it is impossible to perform printing by using the printer from the mobile terminal device.

In Japanese Patent Application Laid-Open No. 2015-191645, since no consideration is given to printers that do not support the standard print format, it is impossible for the user to perform printing unless the user obtains and installs a printer driver that supports the printer.

SUMMARY OF THE INVENTION

The present invention provides an information processing apparatus that can separately use a printing system included in an OS of the information processing apparatus and a print plug-in if printing from the information processing apparatus is performed, so as to conform to the user's intention without impairing the user's convenience.

An information processing apparatus according to one embodiment of the present invention is an information processing apparatus that executes an operating system (OS) including a printing system that supports a first search protocol and a printing function using a first printing method as a standard, comprising: a memory storing instructions; and a processor which is capable of executing the instructions causing the information processing apparatus to: receive a message conforming to the first search protocol from a printer that has been newly detected via the first search protocol if instructions for the use of the printing system included in the OS are provided by a user; and activate a function for downloading a plug-in that supports the printer if the printer is determined not to conform to the first printing method based on contents of the received message in a case where the detected printer has been selected.

Further features of the present invention will become apparent from the following description of exemplary embodiments (with reference to the attached drawings).

BRIEF DESCRIPTION OF THE DRAWINGS

FIG. 4 illustrates an example of a supporting print plug-in table.

FIG. 9 illustrates an example of a list of detected printers.

FIGS. 11A to 11C illustrate examples of a setting screen of a print plug-in.

DESCRIPTION OF THE EMBODIMENTS

Hereinafter, embodiments for carrying out the present invention will be described with reference to the drawings and the like.

First Embodiment

Figure 1:
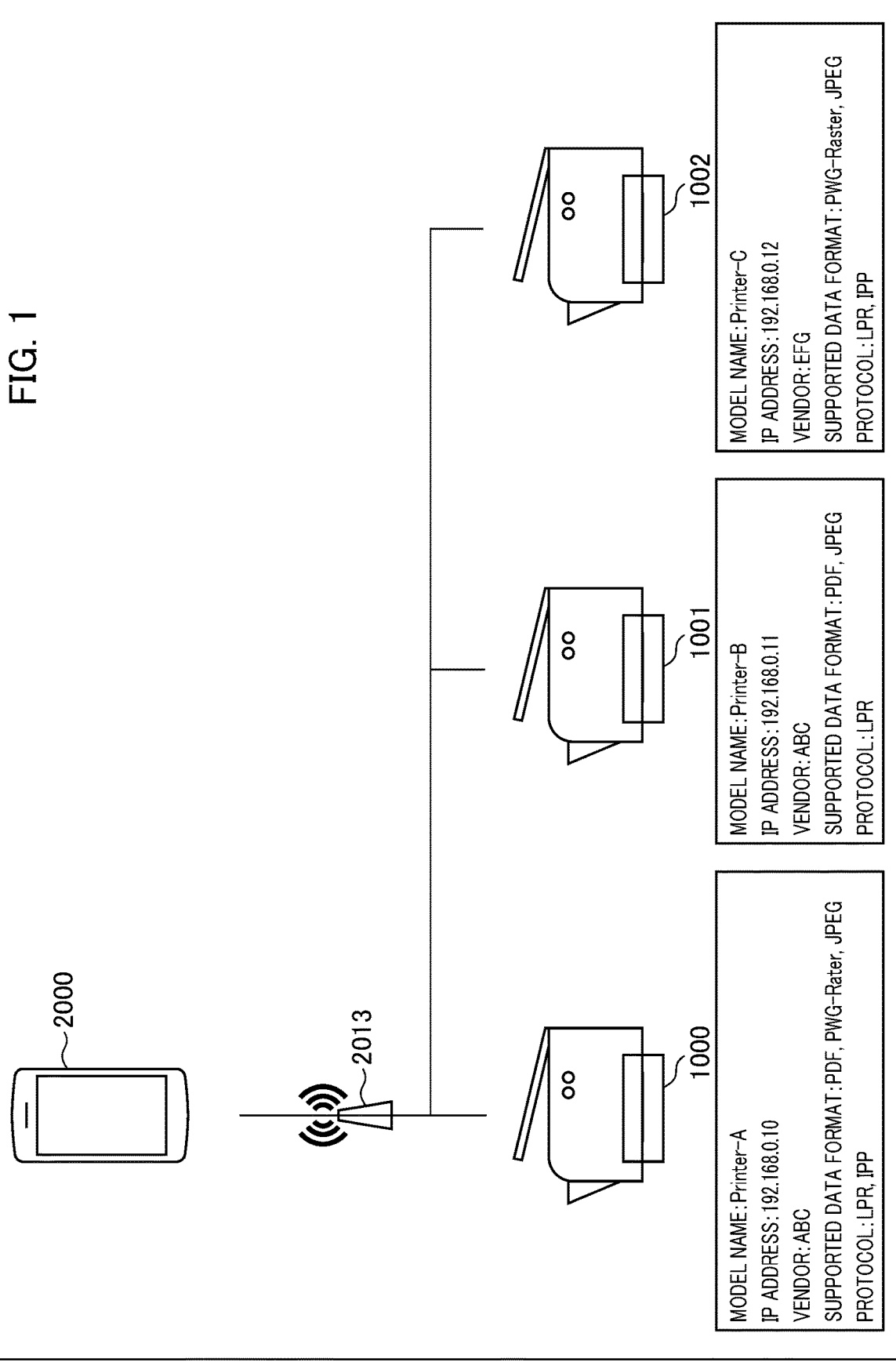
FIG. 1 is a network configuration diagram in embodiments of the present invention.

FIG. 1 illustrates a network configuration according to the present embodiment. A mobile terminal device (information processing apparatus) 2000 can access the network via an access point 2013. A printer 1000, a printer 1001, and a printer 1002 are connected to the network.

As shown in FIG. 1, each printer internally holds the model name and the IP address information. Additionally, each printer has different capabilities, and internally holds information that indicates the capabilities.

For example, the printer 1000 supports the following formats as processable print formats. Specifically, the printer 1000 supports PDF (Portable Document Format), PWG-Raster, and JPEG (Joint Photographic Experts Group). Additionally, the printer 1000 supports LPR (Line Printer Remote) and IPP (Internet Printing Protocol) as communication protocols.

Figure 2:
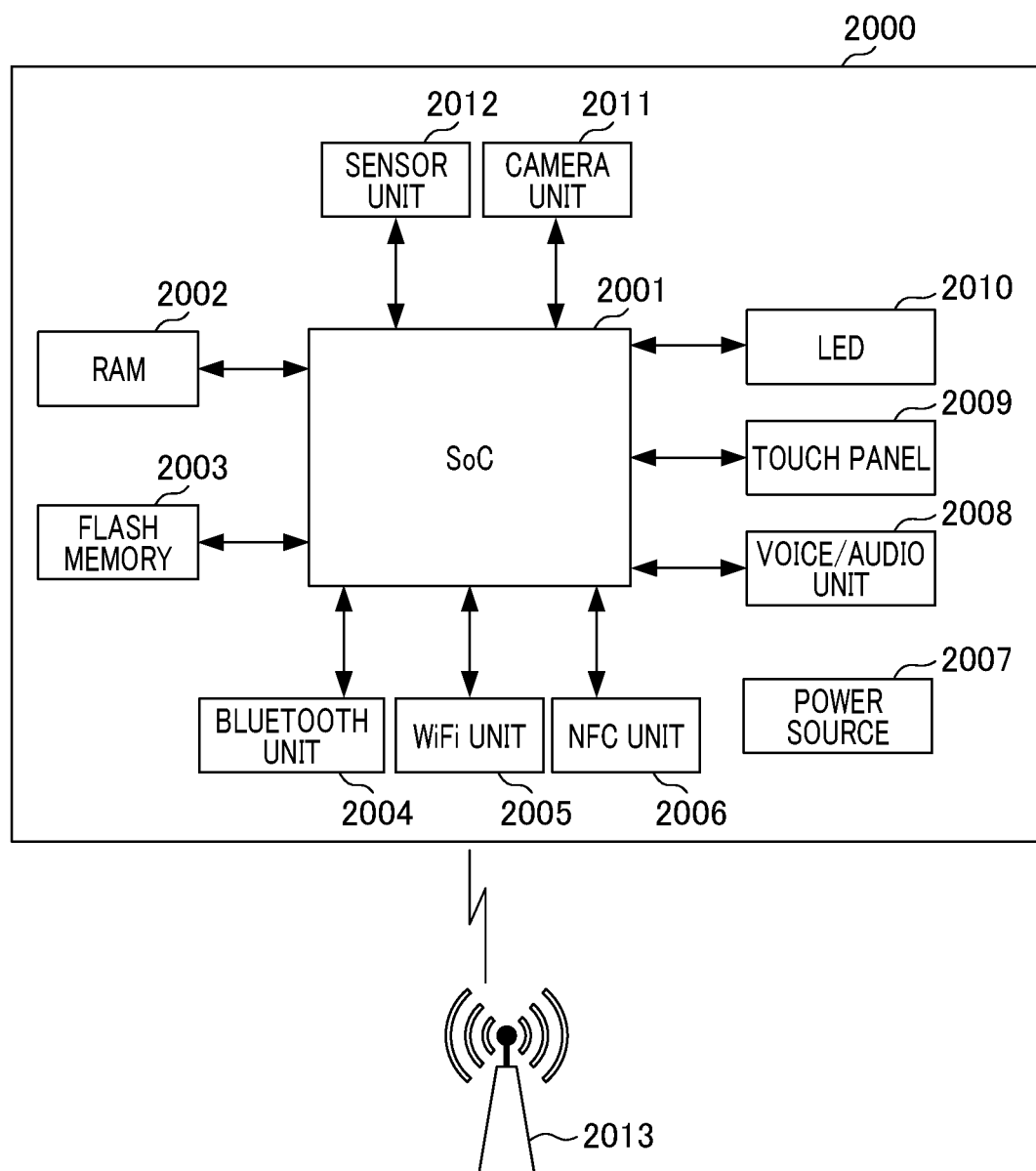
FIG. 2 illustrates an example of a hardware configuration of an information processing apparatus.

FIG. 2 illustrates a hardware configuration of the mobile terminal device 2000. The mobile terminal device 2000 includes a SoC 2001, RAM 2002, flash memory 2003, a Bluetooth unit 2004, a WiFi unit 2005, and an NFC unit 2006. Additionally, the mobile terminal device 2000 also includes a power source 2007, a voice/audio unit 2008, a touch panel 2009, an LED 2010, a camera unit 2011, and a sensor unit 2012.

A principal unit for hardware execution is the SoC (System on a chip) 2001, and a principal unit for software control is a program stored in the flash memory 2003. The flash memory 2003 stores a variety of programs. The programs are deployed in the RAM (Random Access Memory) 2002, interpreted, and executed by SoC.

The Bluetooth unit 2004 performs communication by Bluetooth (registered trademark). The WiFi unit 2005 performs wireless communication via the access point 2013. The NFC unit 2006 is a communication unit that performs short-range wireless communication. The power source 2007 supplies necessary electric power to each unit in the mobile terminal device 2000. The voice/audio unit 2008 includes, for example, a microphone and a speaker, and is used for the input-output of voice.

The touch panel 2009 is an operation input unit that is operated by user's fingers. The LED (Light Emitting Diode) 2010 is used for a variety of displays. The camera unit 2011 includes an imaging unit that shoots photos and moving images. The sensor unit 2012 includes, for example, a GPS (Global Positioning System), an acceleration sensor, a geomagnetic sensor, and a proximity sensor.

Each unit is connected to the SoC 2001, and the mobile terminal device 2000 is connectable to the network via the access point 2013. In the present embodiment, although the OS (operating system) is assumed to be, for example, the "Android OS" (registered trademark) of Google Inc., the present invention is not limited thereto.

Figure 3:
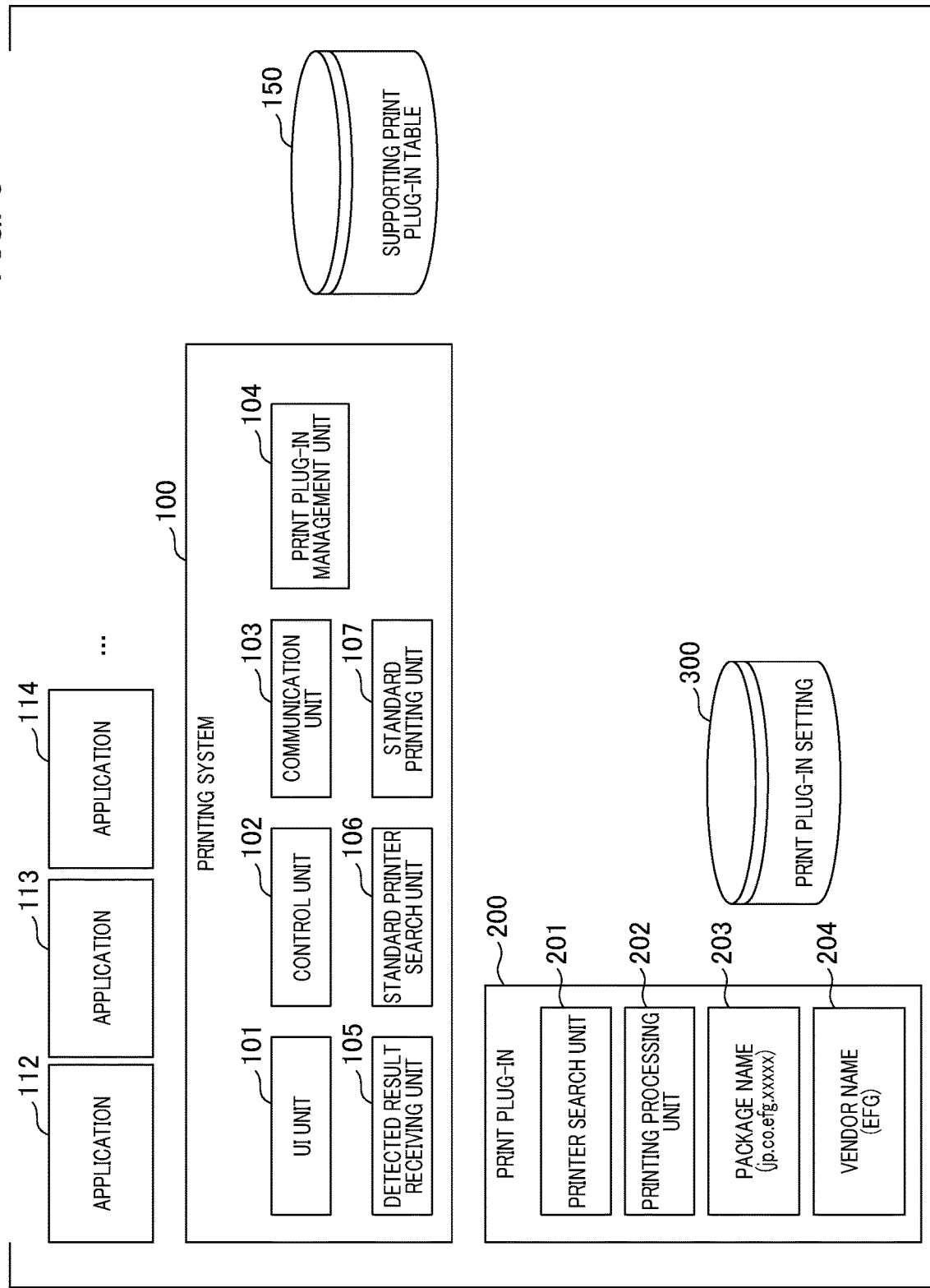
FIG. 3 illustrates an example of a software configuration example of the information processing apparatus.

FIG. 3 illustrates a software configuration that operates on the mobile terminal device 2000. This software program is stored in the flash memory 2003. Applications 112 to 114 installed in the mobile terminal device 2000 have functions for displaying and printing contents (data) such as photos, documents, Web pages via a printing system 100 of the OS.

The printing system 100 includes a UI (User Interface) unit 101, a control unit 102, a communication unit 103, a print plug-in management unit 104, a detected result receiving unit 105, a standard printer search unit 106, and a standard printing unit 107. The UI unit 101 is a user interface of the printing system 100. The control unit 102 controls the operation of the print plug-in installed in the mobile terminal device 2000.

The communication unit 103 performs network communication with the printers 1000 to 1002 using the WiFi unit 2005. The print plug-in management unit 104 manages information about the print plug-in installed in the mobile terminal device 2000. The detected result receiving unit 105 receives a notification of the result for detection of the printer on the network by the print plug-in.

The standard printer search unit 106 is a search function of a printer installed in advance in the OS of the mobile terminal device 2000 and searches for a printer on the network in response to a request from the applications 112 to 114. The standard printing unit 107 is a printing function installed in the mobile terminal device 2000 in advance. After converting data transmitted from each application into the standard printing format in response to a request from the applications 112 to 114, the standard printing unit 107 transmits the data to the printer by the standard communication protocol.

In the present embodiment, the first search protocol and the first printing method supported by the printing system 100 as standard are respectively referred to as the standard search protocol and the standard printing method. The printing method includes a predetermined printing format and a predetermined communication protocol. In the present embodiment, for example, "Bonjour" is used as an example of the standard search protocols. Additionally, as an example of the predetermined format of the standard printing method, for example, "PWG-Raster" is used. Additionally, "IPP" is used as an example of a predetermined communication method of the standard printing method. In the present embodiment, the format of data transmitted from the applications 112 to 114 is PDF format.

If instructions for performing printing are provided from the user via the UI unit 101, the application transmits data in PDF format to the standard printing unit 107. The standard printing unit 107 is a renderer that converts the received data into the standard printing format, PWG-Raster. The standard printing unit 107 transmits the converted data to the printer 1000 via the communication unit 103 by using the IPP protocol.

A print plug-in 200 is composed of a printer search unit 201, a printing processing unit 202, a package name 203, and a vendor name 204. The print plug-in 200 supports a second search protocol and a second printing method that are different from the first search protocol and the first printing method. The print plug-in 200 can realize functions such as searching for a printer that is different from the standard printer search unit 106 and the standard printing unit 107 of the printing system 100, generating a print job, obtaining a printer status, and the like.

The print plug-in 200 bridges the printing system 100 and a printer to be used. Note that although FIG. 3 illustrates a state in which only the print plug-in 200 is installed, a plurality of print plug-ins can be installed in the mobile terminal device 2000. The print plug-in can be installed and uninstalled as necessary, and the print plug-in management unit 104 manages the installation state of each print plug-in.

The printer search unit 201 searches for printers on the network by using multicast or broadcast. The printer search unit 201 uses SLP (Service Location Protocol), Multicast-DNS (Domain Name System), and the like as a search protocol. Note that the search protocol used by the printer search unit 201 is not limited thereto, and, for example, may be different for each print plug-in.

The printing processing unit 202 performs a rendering process on PDL (Page Description Language) data or image data printable by the printers 1000 to 1002. The package name 203 is a unique name assigned to the print plug-in 200, for example, "jp.co.efg.xxxxx". Regarding the package name 203, different names are assigned for each print plug-in and each print plug-in stores the names. The vendor name 204 is a name of the vendor that provides the print plug-in 200.

A print plug-in setting 300 is a region that stores setting values related to the print plug-in 200. The print plug-in setting 300 is stored in the flash memory 2003. The supporting print plug-in table 150 is a table that stores a list of printers on the network detected by the standard printer search unit 106 and a list of print plug-ins that support the printers. The details about the supporting print plug-in table will be described below.

FIG. 4 illustrates an example of the supporting print plug-in table 150. The supporting print plug-in table 150 includes a vendor name 1101, a package name 1102, and a download site 1103. The vendor name 1101 stores a vendor name obtained from the printer on the network by the standard printer search unit 106. The package name 1102 stores a package name of the print plug-in.

The download site 1103 stores the URL information of the download site of the print plug-in. That is, the supporting print plug-in table 150 stores information about the vendor name and the package name, and the download site of the print plug-in as a list of print plug-ins in association with each other. By referring to the supporting print plug-in table 150, it is possible to connect the printer searched on the network and the print plug-in that supports the printer.

Accordingly, if the print plug-in that supports the printer that has been found has not been installed, the printing system 100 can guide a user to the download site. For example, table data 1104 shows the following information. In the case of the printer having a vendor name "ABC", the package name of the supporting print plug-in is "jp.co.abc.xxxxx", and the download site of the print plug-in is "http:store.abc.printplugin".

Figure 5A:
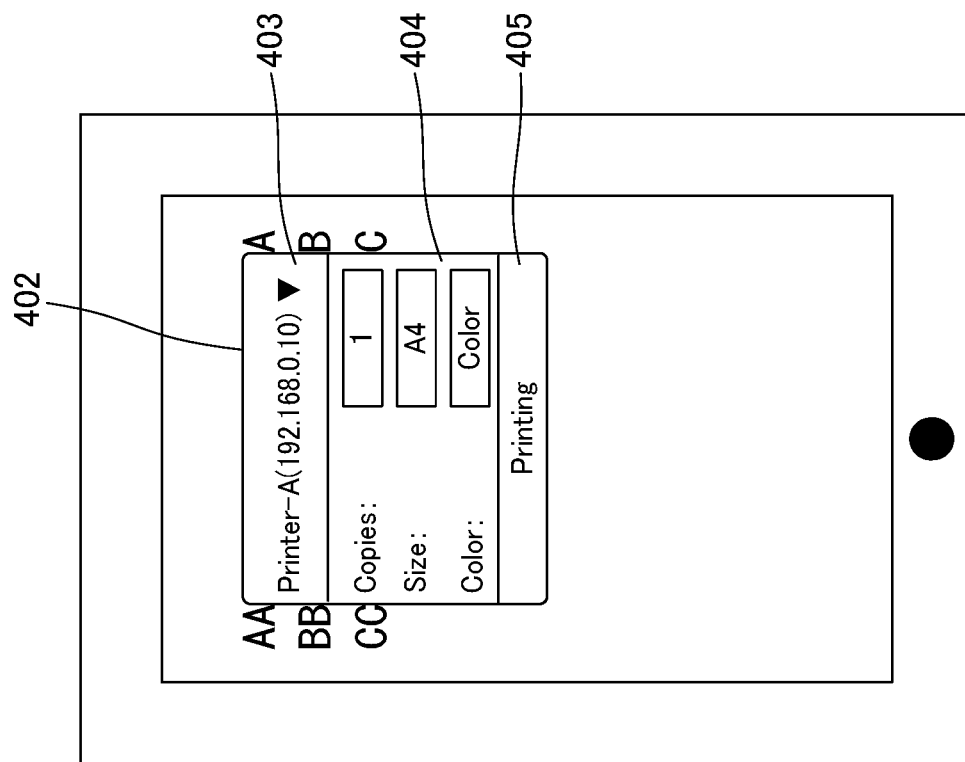
FIGS. 5A to 5C illustrate examples of a screen displayed by a printing system.

FIGS. 5A to 5C and FIGS. 6A to 6C illustrate examples of a screen displayed by the printing system 100. FIG. 5A illustrates a screen 400 on which data to be printed on the application is displayed. If the user taps a printing button 401 on the screen 400, the UI unit 101 of the printing system 100 is invoked. The UI unit 101 of the printing system 100 displays the screens shown in FIG. 5B, FIG. 5C, or FIG. 6A depending on conditions.

In the present embodiment, if the user taps the printing button 401 in FIG. 5A, the UI unit 101 of the printing system 100 displays the printing setting screen. The process before the printing setting screen is displayed will be described below.

Figure 7:
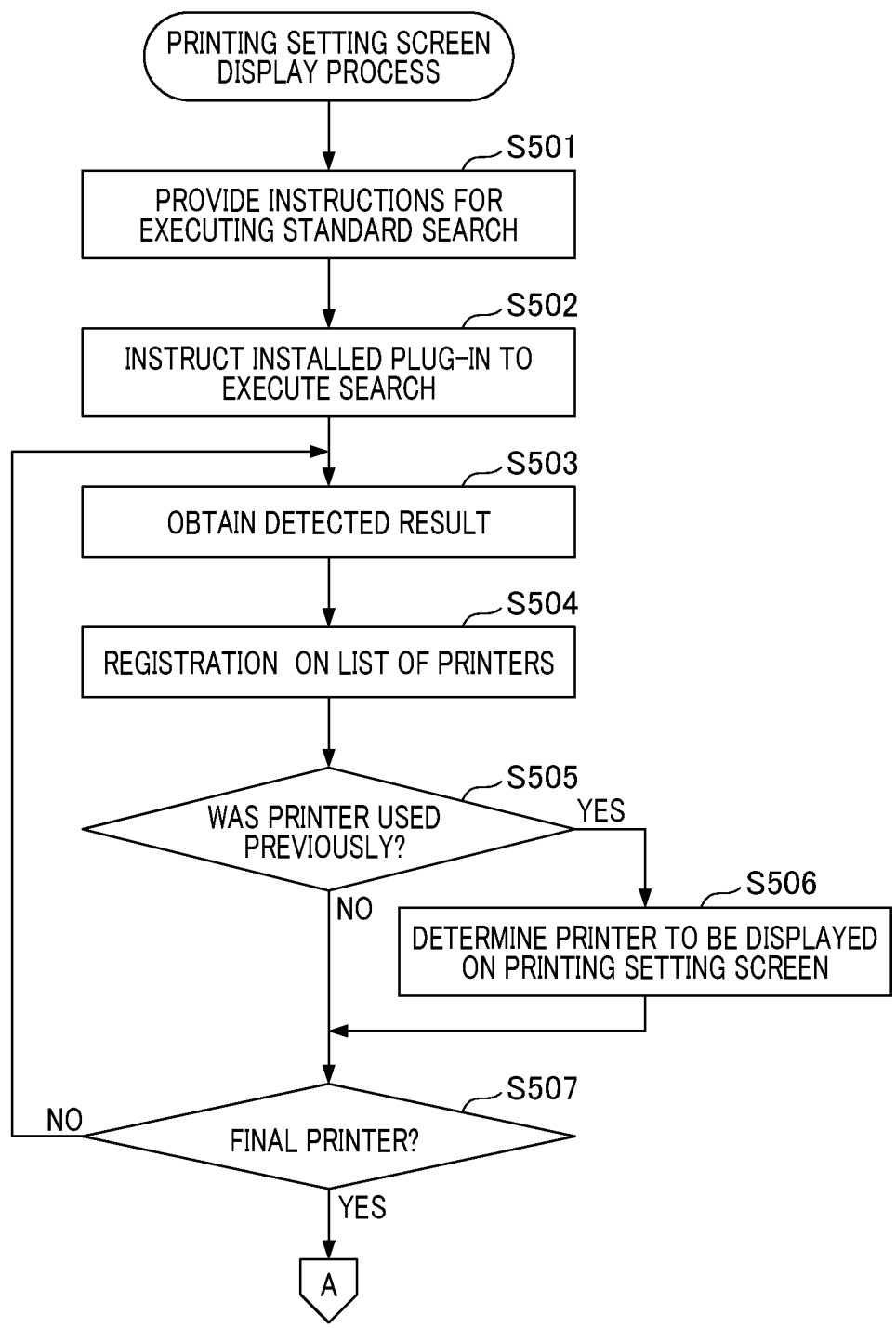
FIG. 7 is a flowchart illustrating an operation until a printing setting screen is displayed.
Figure 8:
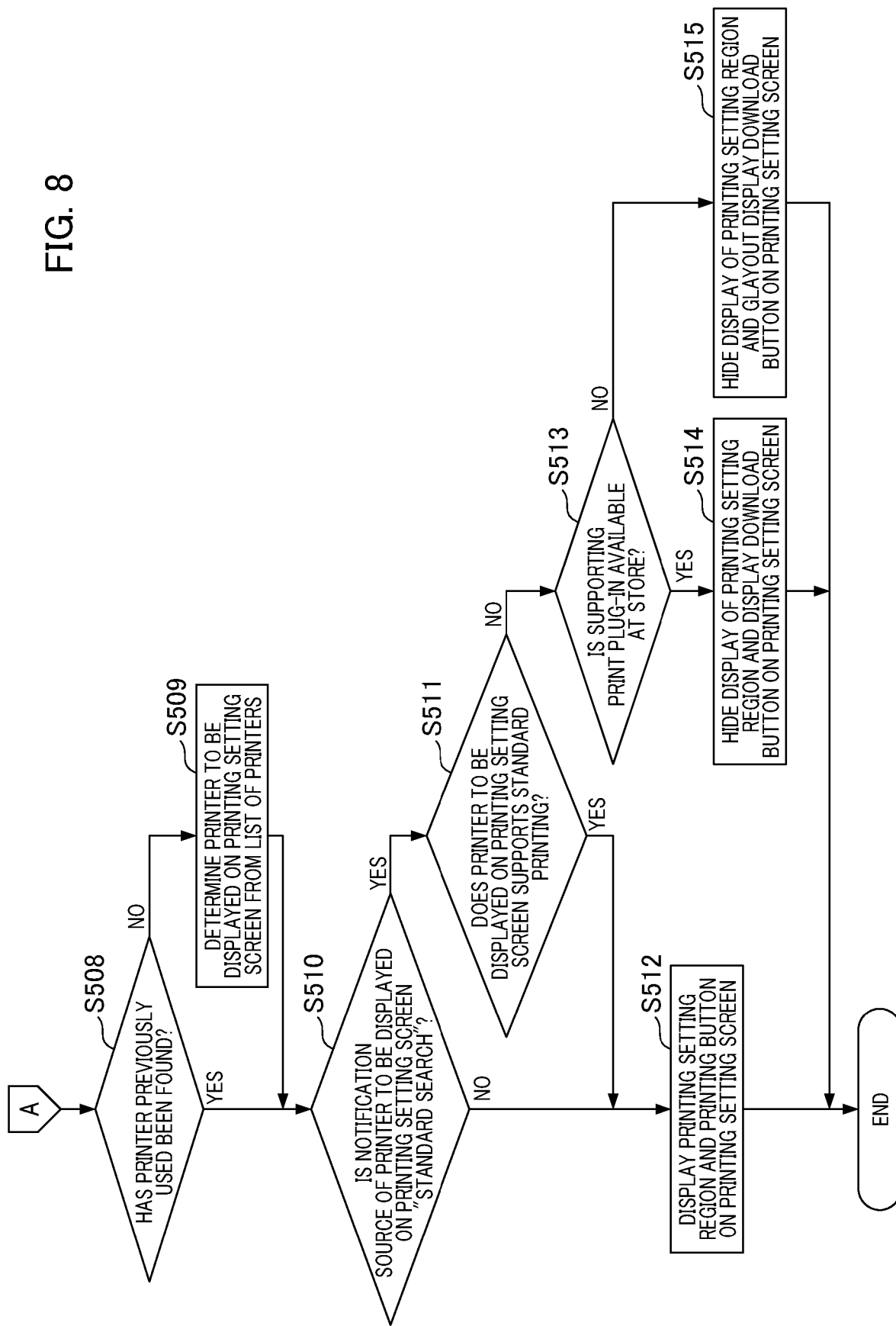
FIG. 8 is a flowchart illustrating an operation until the printing setting screen is displayed.

FIGS. 7 and 8 are a flowchart illustrating an example of the operation of the printing system 100 after the printing button 401 has been tapped. The process shown in FIGS. 7 and 8 is realized by loading the program stored in the flash memory 2003 into the RAM 2002 and executing it by the SoC 2001.

If the printing button 401 is tapped, in step S501, the control unit 102 of the printing system 100 instructs the standard printer search unit 106 to search for a printer. The standard printer search unit 106 searches for a printer on the network by using the standard search protocol, Bonjour, via the communication unit 103. In step S502, the control unit 102 instructs the printer search unit 201 of the print plug-in 200 installed in the mobile terminal device 2000 to search for a printer.

In step S504, the detected result receiving unit 105 receives the printer information detected from the standard printer search unit 106 and the printer search unit 201, which are instructed to search for a printer. The printer information is received as a message conforming to the search protocol used by the standard printer search unit 106 or the printer search unit 201. For example, if Bonjour is used as a search protocol, a TXT Record is received. In step S504, the control unit 102 registers the printer information received in step S503 in the list of detected printers. Details of the list of detected printers will be described below.

FIG. 9 illustrates an example of the list of detected printers. A detected printer list 700 consists of a model name 701, an IP address 702, a notification source 703, a support of standard printing 704, a vender 705, and a plug-in 706. The data of one row of the detection printer list 700 shows the data for one detected printer. The detected printer list 700 is stored in the RAM 2002.

The model name 701 stores the model name of the detected printer. The IP address 702 stores the IP address of the detected printer. The notification source 703 stores notification source information when the detected result receiving unit 105 receives the detected result in step S503. If the detected result receiving unit 105 receives the detected result from the standard printer search unit 106 in step S503, "standard search" is stored in the notification source 703.

In contrast, in step S503, if the detected result receiving unit 105 receives the detected result from the printer search unit 201 of the print plug-in 200, the package name of the print plug-in is stored in the notification source 703. In the example shown in FIG. 9, the detected result of the model name 701 "Printer-D" shows that the print plug-in 200 is the notification source and "jp.co.efg.xxxxx" that is a package name of the print plug-in 200 is stored in the notification source 703.

The item of support of standard printing 704 indicates the presence or absence of the support of a print job generated by the standard printing unit 107. In the example shown in FIG. 9, if the support of the print job generated by the standard printing unit 107 is present, "Yes" is stored in the item of support of standard printing 704, and if the support of the print job generated by the standard printing unit 107 is absent, "No" is stored. More specifically, in the present embodiment, if the control unit 102 determines that the detected printer supports both the standard printing format "PWG-Raster" and the standard communication protocol "IPP", "Yes" is stored in the item of support of standard printing 704.

In contrast, if the control unit 102 determines that the detected printer does not support any of the standard printing format and the standard communication protocol, "No" is stored in the item of support of standard printing 704. The control unit 102 determines the presence or absence of the support of the standard printing format and the standard communication protocol depending on the contents of the response from the printer received by the standard printer search unit 106. Note that the item of support of standard printing 704 is stored only if the notification source of the detected result is the standard printer search unit 106 and "NA", meaning "Not applicable", is stored if the notification source is the printing plug-in 200.

The vendor 705 stores the name of the vendor that provides the detected printer. The plug-in 706 stores information as to whether or not the print plug-in supporting the printer is installed on the mobile terminal device 2000. If a print plug-in that supports the printer has been installed on the mobile terminal device 2000, "Installed" is stored. If not, "Not installed" is stored.

The print plug-in management unit 104 determines whether or not a print plug-in that supports the printer is installed on the mobile terminal device 2000 by referring to whether or not a print plug-in supporting the vendor name of each printer is installed. Note that the plug-in 706 is stored only if the notification source of the detected result is the standard printer search unit 106. In contrast, if the notification source is the printing plug-in 200, "NA" meaning "not applicable" is stored.

The description will return to the flowchart of FIG. 7. In step S505, the control unit 102 determines whether or not the printer shown by the printer information received in step S503 is the printer that has been used in the previous printing via the printing system 100. More specifically, the control unit 102 determines the above based on printer information (not illustrated) stored in the flash memory 2003 during the previous printing via the printing system 100.

Figure 5B:
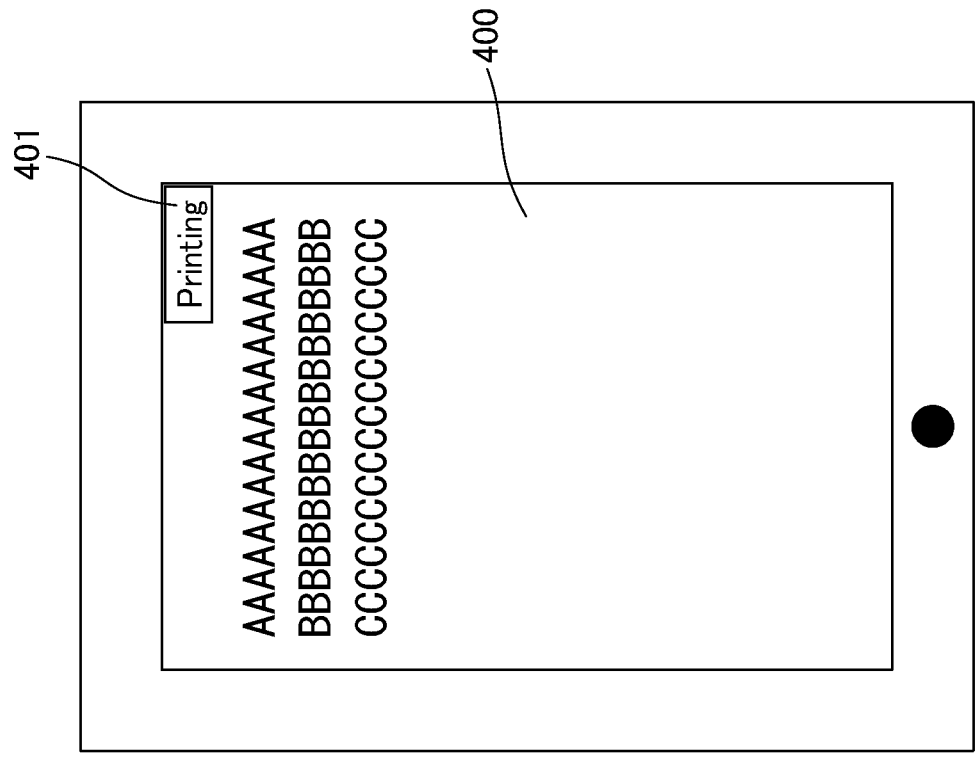

If it is determined in step S505 that the printer has been used for the previous printing, the process proceeds to step S506, and the control unit 102 determines the printer to be used displayed on a printing setting screen 402 shown in FIG. 5B, to be the printer that has been used for the previous printing.

The printing setting screen 402 shown in FIG. 5B includes a target printer display region 403, a printing setting region 404, and a printing button 405. The target printer display region 403 is a region that displays a printer to be used. The user provides instructions for the use of the printing system 100 by tapping the printing button 405. After confirming the desired printing setting in the printing setting region 404, the user taps the printing button 405 so that data of the application is transmitted to the printer to be used, which is displayed on the target printer display region 403.

In the example shown in FIG. 5B, the printer having the printer name, "Printer-A" and IP address, "192.168.0.10", which has been determined to be the printer used in the previous printing in step S505, is selected in the target printer display region 403. If the output destination of data is changed to another printer, the user taps the target printer display region 403.

Figure 6A:
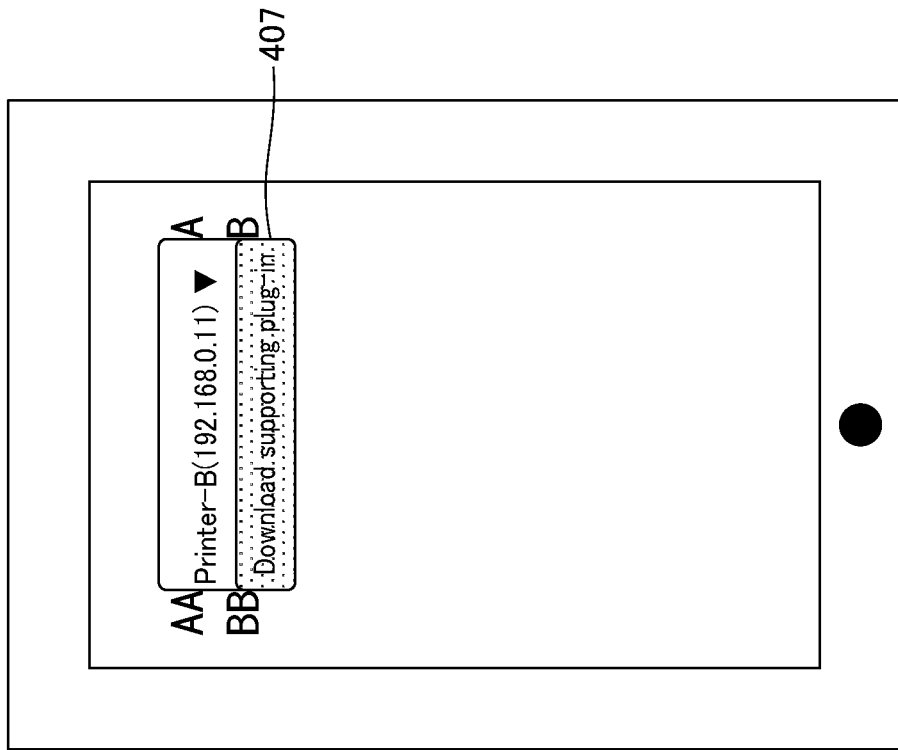
FIGS. 6A to 6C illustrate examples of the screen displayed by the printing system.
Figure 6C:
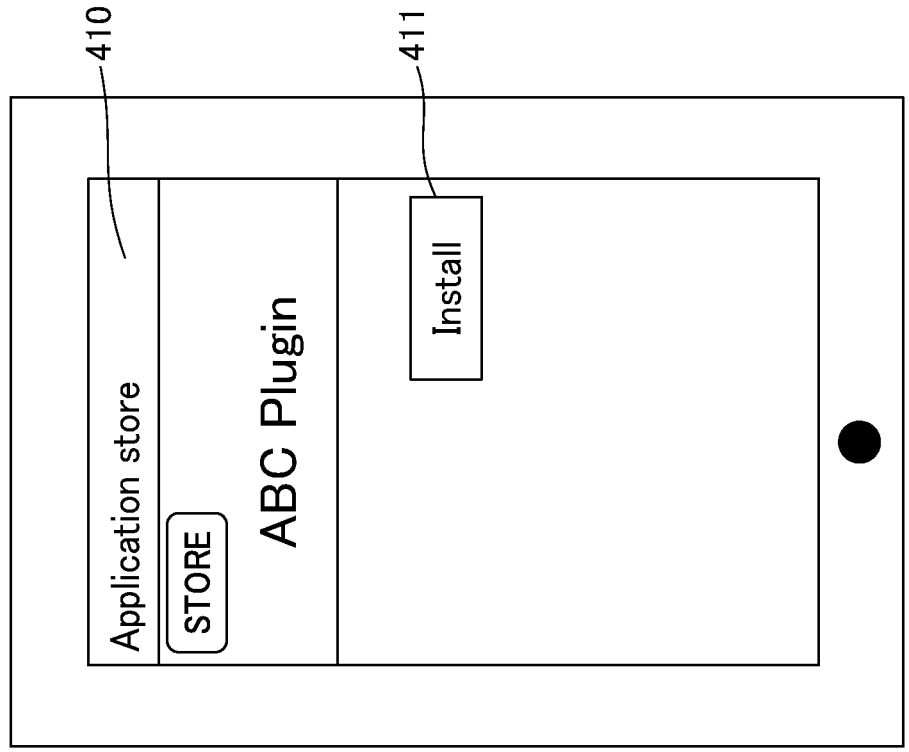
Figure 6B:
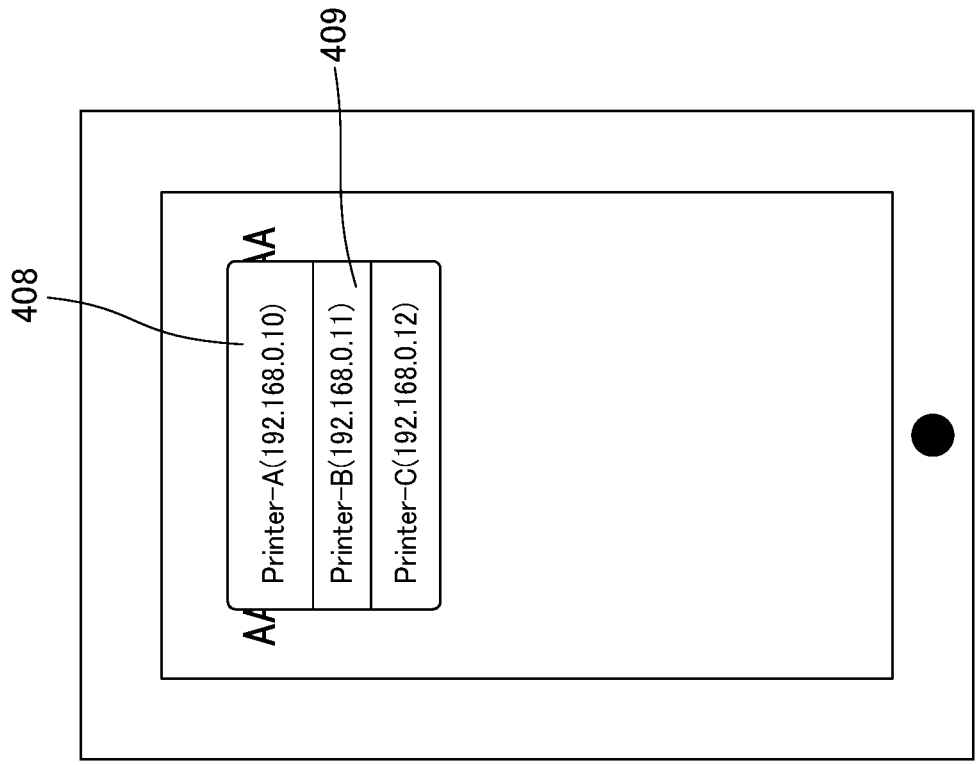

If the target printer display region 403 is tapped, a printer list screen 408 shown in FIG. 6B is displayed. On the printer list screen 408 in FIG. 6B, the UI unit 101 displays the printers on the network based on the printer information stored in the detected printer list 700 (FIG. 9). Details of the process when the printer is selected by the tapping on the printer list screen 408 will be described below with reference to FIG. 10.

In contrast, if it is determined in step S505 that the printer is not the one that has been used for the previous printing, the process proceeds to step S507, and the control unit 102 determines whether or not the printer detected in step S503 is the final one. If it is determined in step S507 that the printer is the final one, the process proceeds to step S508 in FIG. 8. In contrast, if it is determined in step S507 that the printer is not the final one, the process returns to step S503, and the processes from steps S503 to S507 are repeated.

In step S508, the control unit 102 determines whether or not the printer that is determined to be the printer used in the previous printing in step S505 has been found. If it is determined in step S508 that the printer used for the previous printing has not been found, the process proceeds to step S509, and if it is determined that the printer has been found, the process proceeds to step S510.

In step S509, the control unit 102 selects one printer from the detected printer list 700 (FIG. 9) registered in step S504. Then, the UI unit 101 displays the selected printer in the target printer display region 403 in FIG. 5B. Note that if the control unit 102 selects the printer in step S509, any standard for selecting the printer may be used. For example, the control unit 102 may preferentially select the printer first detected in step S503, or may preferentially select the printer for which the item of support of standard printing 704 of the detected printer list 700 is "Yes".

In step S510, the control unit 102 refers to the detected printer list 700 and determines whether or not the notification source 703 of the printer displayed on the target printer display region 403 is a "standard search". If it is determined in step S510 that the notification source 703 is not a "standard search", the process proceeds to step S512, and if it is determined that the notification source 703 is a "standard search", the process proceeds to step S511.

In step S511, the control unit 102 refers to the detected printer list 700 and determines whether or not the item of support of standard printing 704 of the printer displayed on the target printer display region 403 is "Yes". If it is determined in step S511 that the item of support of standard printing 704 is "Yes", the process proceeds to step S 512. If it is determined that the item of support of standard printing 704 is other than "Yes", the process proceeds to step S513.

In step S512, the control unit 102 displays the printing setting screen 402 including the target printer display region 403, the printing setting region 404, and the printing button 405 as shown in FIG. 5B via the UI unit 101, and the process ends. In the present embodiment, although FIG. 5B is used as an example of the printing setting screen 402, the contents of the printing setting screen 402 displayed in step S512 are different depending on whether the notification source is the standard search or the print plug-in in step S510.

In step S513, the control unit 102 determines whether or not the print plug-in that supports the printer displayed on the target printer display region 403 is available in a store that is an application distribution service. More specifically, the control unit refers to the supporting print plug-in table 150 (FIG. 4), and if the print plug-in associated with the vendor name of the printer displayed on the target printer display region 403 is present, the control unit determines that the plug-in is available at the store.

Figure 5C:
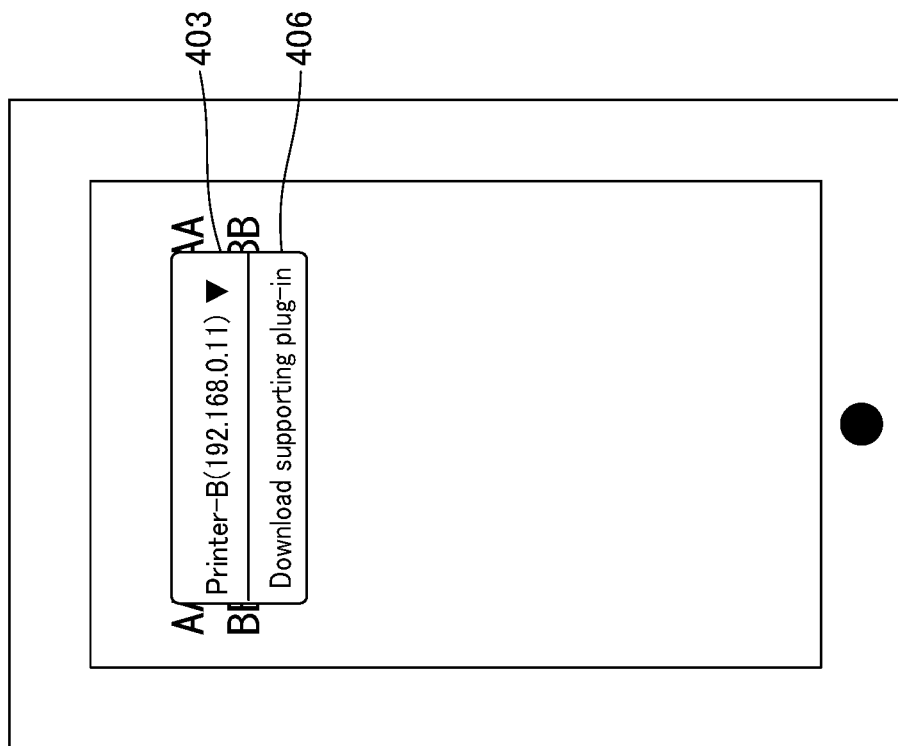

In step S513, if it is determined that the supporting print plug-in is available at the store, the process proceeds to step S514. If it is determined that the supporting print plug-in is not available at the store, the process proceeds to step S515. In step S514, the control unit 102 hides the display of the printing setting region 404 as shown in FIG. 5C via the UI unit 101, additionally displays a download button 406 instead of the printing button 405, and ends the process.

Specifically, if the printer detected by the standard search protocol does not support the standard printing method, the control unit 102 controls the display so as to display an object that activates a function for downloading the plug-in that supports the printer. In the present embodiment, the download button 406 is a means for activating the function for downloading the print plug-in that supports the printer.

If the download button 406 is tapped, as shown in FIG. 6C, the screen transitions to a store screen 410 of the print plug-in that supports the printer displayed on the target printer display region 403. If an install button 411 is tapped on the store screen 410 in FIG. 6C, the print plug-in management unit 104 downloads the print plug-in supplied on the download site 1103 that supports the printer in the mobile terminal device 2000.

Subsequently, the print plug-in management unit 104 installs the print plug-in that has been downloaded in the mobile terminal device 2000. Note that, in the present embodiment, although the download button 406 is shown as a means for activating the function for downloading the print plug-in, the present invention is not limited thereto. For example, if it is determined in step S513 that the supporting print plug-in is available at the store, it may be possible to control the display so that the display of the screen directly transitions to the store screen 410 of the print plug-in.

In step S515, the control unit 102 hides the display of the printing setting region 404 as shown in FIG. 6A via the UI unit 101 while displaying a download button 407 in a gray-out state instead of the printing button 405, and ends the process.

Figure 10:
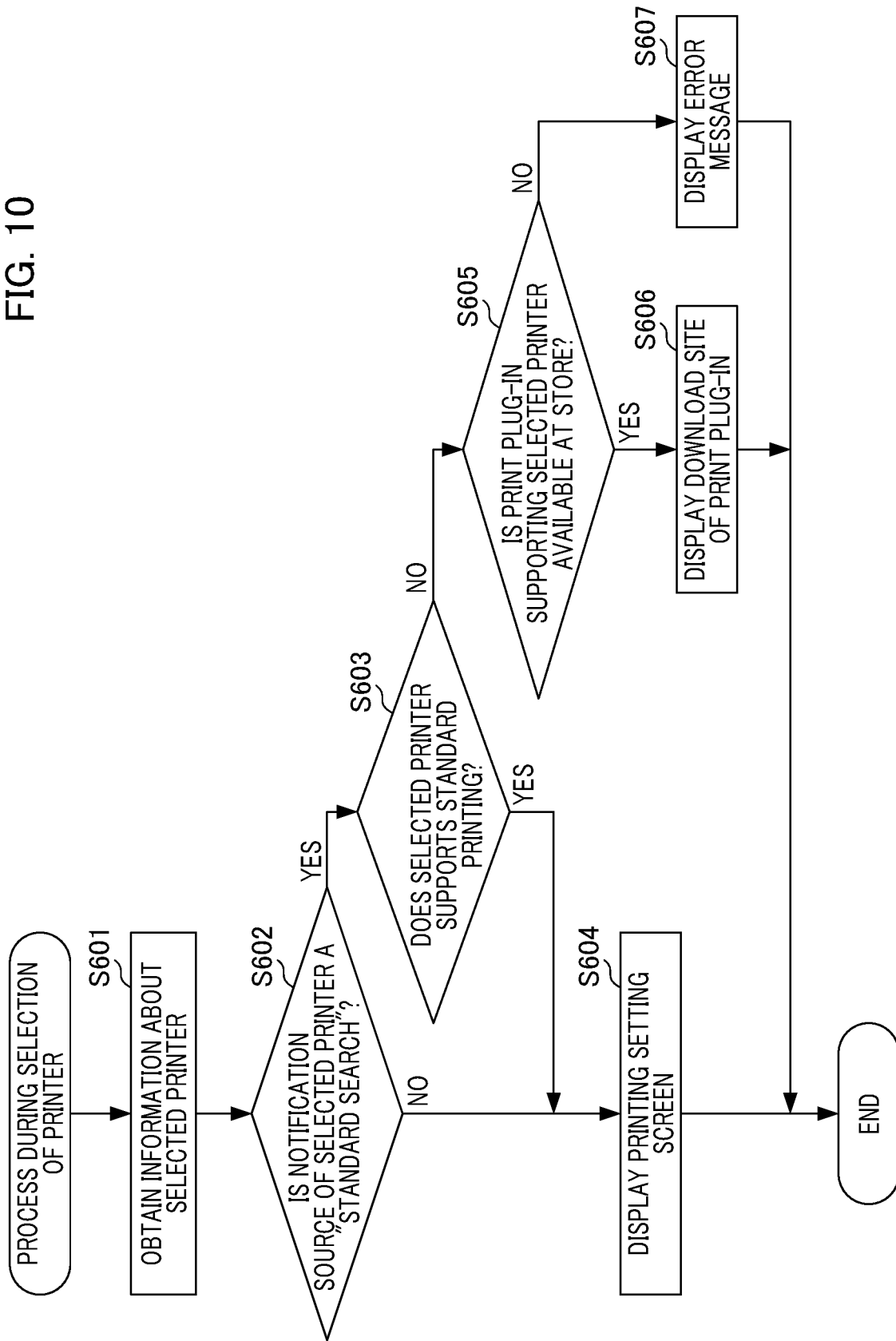
FIG. 10 illustrates an operation if a printer is selected from a printer list screen.

Next, a description will be given of a process executed by the printing system 100 if a printer is selected on the printer list screen 408 shown in FIG. 6B. FIG. 10 is a flowchart illustrating an example of the operation of the printing system 100 if a printer 409 is selected on the printer list screen 408 shown in FIG. 6B. The process shown in FIG. 10 is realized by loading the program stored in the flash memory 2003 into the RAM 2002 and executing the program by the SoC 2001.

It is assumed that the printer 409 is tapped on the printer list screen 408. In step S601, the control unit 102 obtains the information about the tapped printer from the detected printer list 700 (FIG. 9). In step S602, the control unit 102 determines whether or not the notification source 703 of the printer information obtained in step S601 is a "standard search".

In step S602, if it is determined that the notification source 703 is a "standard search", the process proceeds to step S603. In contrast, if it is determined in step S602 that the notification source 703 is not a "standard search", in other words, the printer search unit 201 of the print plug-in 200 is the notification source, the process proceeds to step S604.

In step S603, the control unit 102 determines whether or not the item of support of standard printing 704 of the printer information obtained in step S601 is "Yes", in other words, whether or not the printer supports standard printing. In step S603, if it is determined that the printer supports standard printing, the process proceeds to step S604. If it is determined that the printer does not support standard printing, the process proceeds to step S605.

In step S604, the control unit 102 displays the printing setting screen 402 in FIG. 5B in the following state via the UI unit 101. Specifically, in the target printer display region 403 of the printing setting screen 402, the printer 409 tapped on the printer list screen 408 is displayed. Then, the control unit 102 ends the process.

In step S605, the control unit 102 determines whether or not the print plug-in that supports the printer 409 that was tapped on the printer list screen 408 is available in the store. Since the determination as to whether or not the print plug-in supporting the printer 409 that has been tapped on the printer list screen 408 is available in the store is similar to that in step S513, the detailed description thereof will be omitted. In step S605, if it is determined that the print plug-in that supports is available in the store, the process proceeds to step S606, and if it is determined that the print plug-in that supports is not available in the store, the process proceeds to step S607.

In step S606, the control unit 102 displays the store screen 410 of the print plug-in that supports the printer 409 selected on the printer list screen 408 as shown in FIG. 6C via the UI unit 101, and ends the process. In step 607, the control unit 102 displays an error message (not illustrated) indicating that there is no print plug-in that is available via the UI unit 101, and ends the process.

As described above, according to the present embodiment, during printing from the information processing apparatus, the printing system included in the OS of the information processing apparatus and the print plug-in can be separately used to match the user's intention without diminishing the convenience to the user. For example, in a case where a printer that does not support the standard printing method, which has been detected by the standard search protocol, is selected, if the print plug-in that supports the printer is not installed, the user can be guided to download the print plug-in.

Second Embodiment

If the printer supports standard printing, the printer search unit 201 of the print plug-in 200 that has been installed and the standard printer search unit 106 of the printing system 100 can detect the same printer. In this case, in the first embodiment, the same printers are displayed in duplicate on the printer list screen. The display of the same printers on the printer list screen may confuse the user.

However, it is inconvenient for a user who wants to continue using the standard printing function to simply hide the display of the printer that has been detected by the standard printer search unit 106 on the printer list screen. In contrast, in the present embodiment, if the print plug-in and the printing system detect the same printers, the setting is possible so as not to impair the convenience for the user who wants to use the standard printing function while avoiding the inconvenience of the same printers being displayed in duplicate.

Figure 11B:
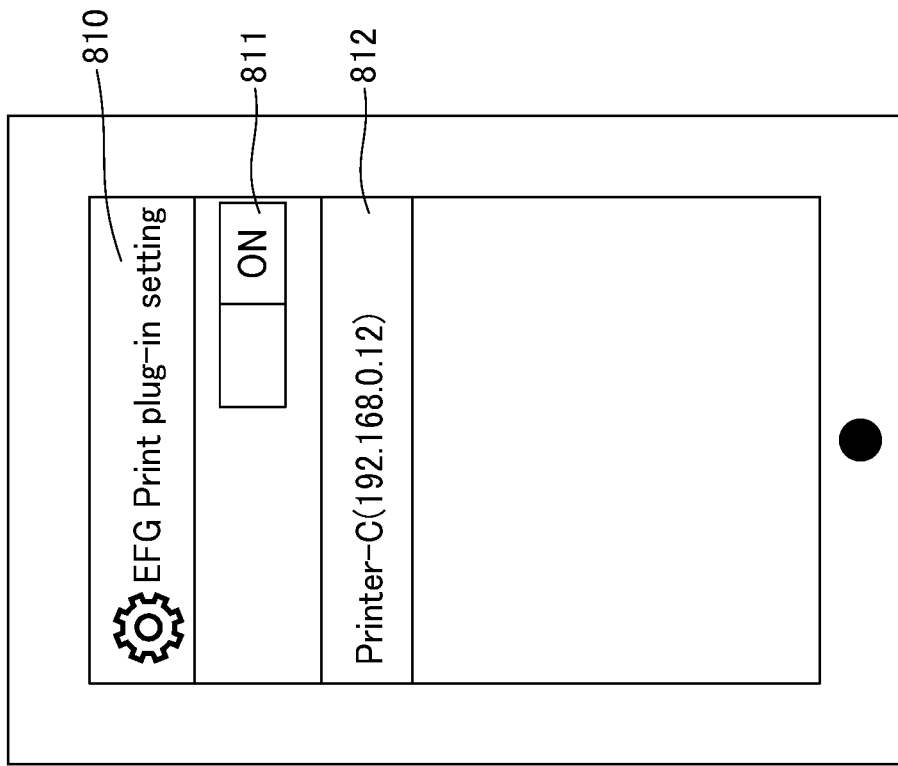
Figure 11A:
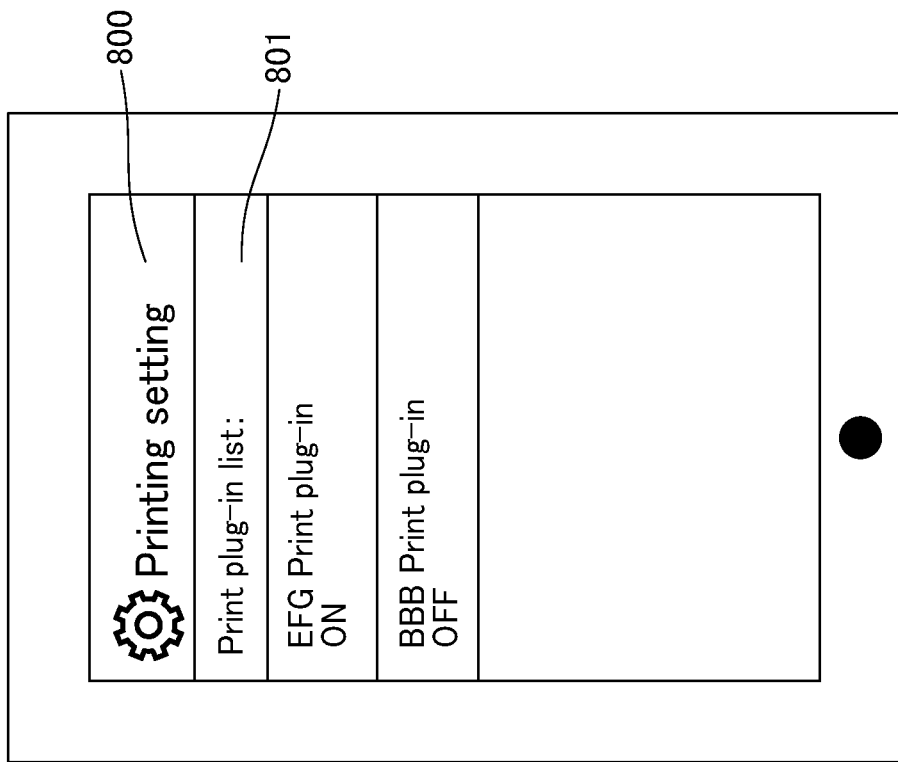
Figure 11C:
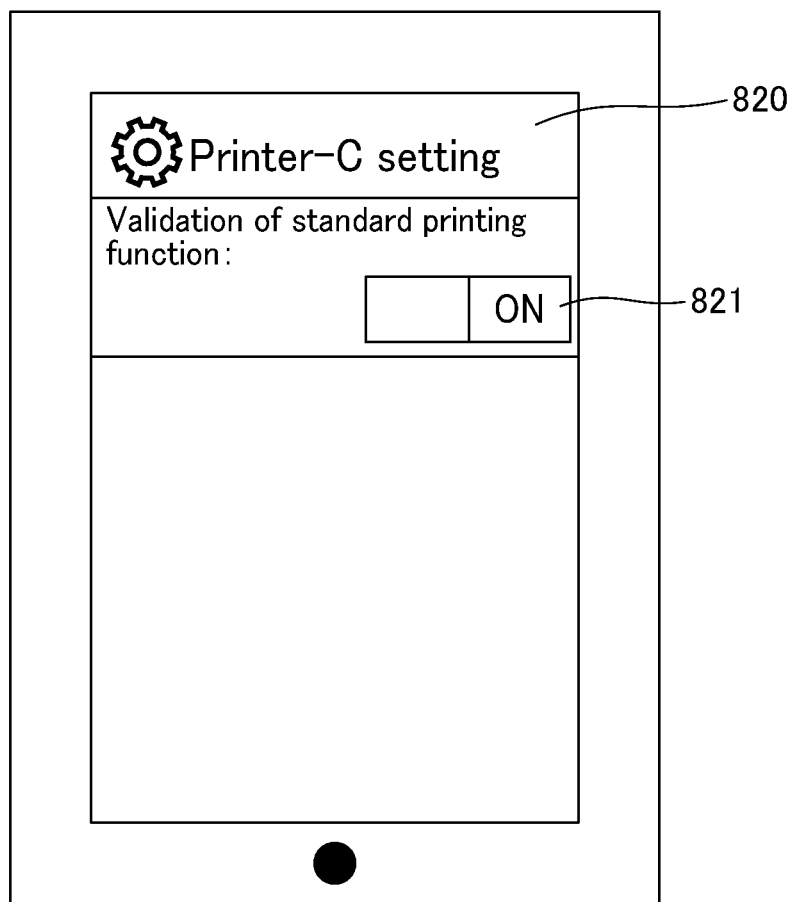

FIGS. 11A to 11C illustrate an example of the setting screen of the print plug-in that has been installed. FIG. 11A illustrates a printing setting screen 800 of the print plug-in that has been installed. The printing setting screen 800 has a print plug-in list 801. On the print plug-in list 801, a list of printing plug-ins installed on the mobile terminal device 2000 is displayed. If a specific print plug-in is tapped on the print plug-in list 801, the display of the screen transitions to a print plug-in setting screen 810 that performs the setting related to the selected print plug-in.

FIG. 11B illustrates the print plug-in setting screen 810 that performs the setting related to a specific plug-in tapped on the printing setting screen 800. The print plug-in setting screen 810 has a print plug-in validating setting 811 and a printer list 812. The print plug-in validating setting 811 validates or invalidates a specific print plug-in targeted on the print plug-in setting screen 810.

If the print plug-in is invalidated by the print plug-in validating setting 811, the printing system 100 does not invoke the print plug-in. The printer list 812 displays a list of printers found by the printer search unit 201 of the print plug-in. If the printer displayed on the printer list 812 is tapped, the display of the screen transitions to a printer setting screen that performs the setting related to the selected printer.

FIG. 11C illustrates a printer setting screen 820 that performs the settings related to the printer that has been tapped on the print plug-in setting screen 810. The printer setting screen 820 is present for each printer found by the printer search unit 201 of the print plug-in. The printer setting screen 820 has a validating setting 821 of the standard printing function. The validating setting 821 of the standard printing function validates or invalidates the standard printing function of the printer targeted on the printer setting screen 820.

If the printer validating setting 821 is set to "ON" on the printer setting screen 820, the standard printing function is validated. Alternatively, if the validating setting 821 of the printer is set to "OFF" on the printer setting screen 820, the standard printing function is invalidated. The setting contents of the validating setting 821 of the standard printing function are stored in the flash memory 2003 as the print plug-in setting 300 (FIG. 3).

Figure 12:
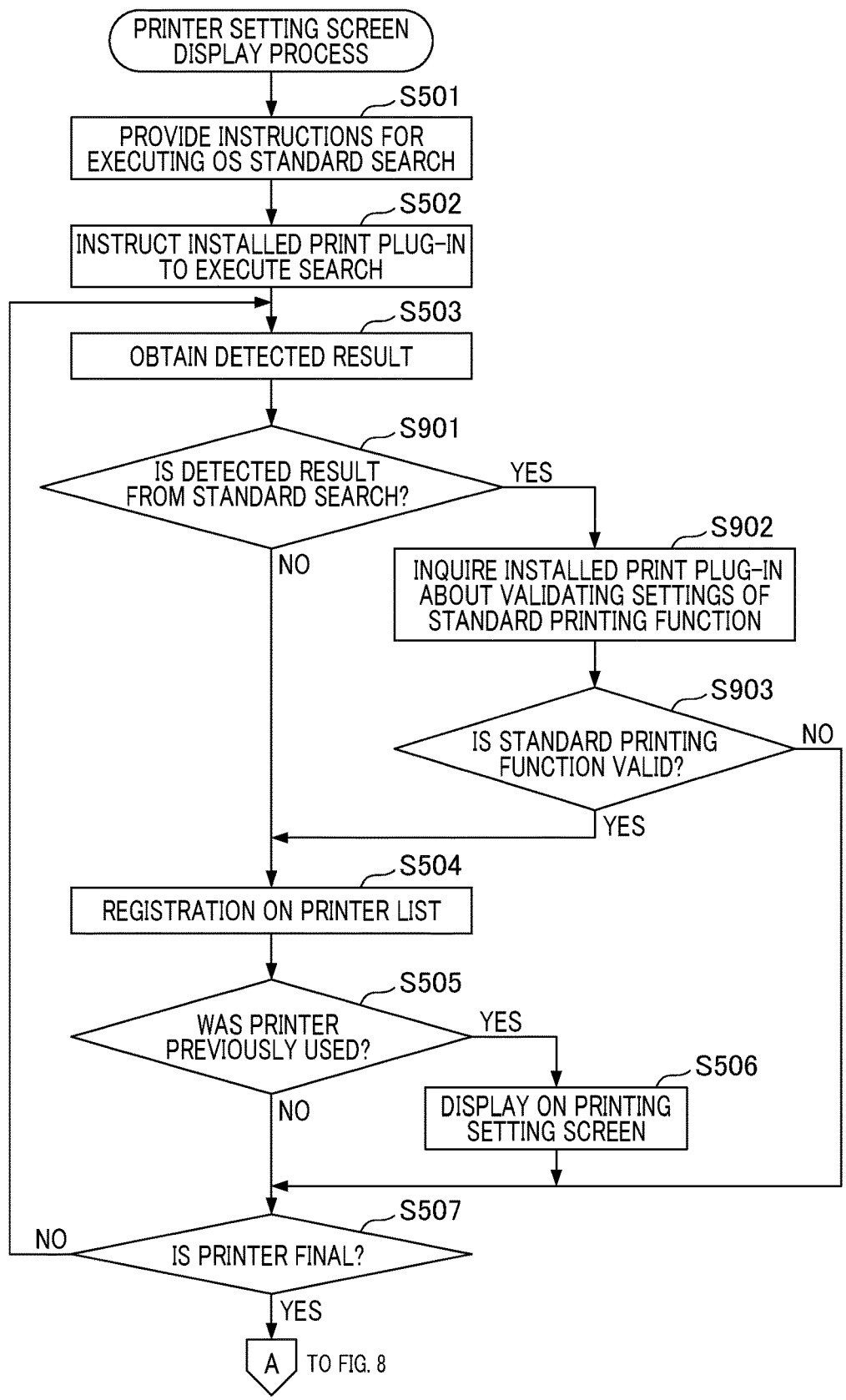
FIG. 12 is a flowchart illustrating an operation until the printing setting screen is displayed.

In the present embodiment, FIG. 12 is a flowchart illustrating an example of the operation of the printing system 100 after the printing button 401 in FIG. 5A has been tapped. Note that the same reference numerals are given to the same processes in the flowcharts (FIGS. 7 and 8) described as the operation of the printing system 100 in the first embodiment, and the description thereof will be omitted. The process illustrated in FIG. 12 is realized by loading a program stored on the flash memory 2003 into the RAM 2002, and executing the program by the SoC 2001.

After the processes in steps S501 to S503 are executed, in step S901, the control unit 102 determines whether or not the notification source of the printer information received by the detected result receiving unit 105 in step S503 is the standard printer search unit 106. If it is determined in step S901 that the notification source is the standard printer search unit 106, the process proceeds to step S902. If it is determined that the notification source is not the standard printer search unit 106, the process proceeds to step S504.

In step S902, the control unit 102 inquires the printer search unit 201 of the print plug-in 200 about the validating settings of the standard printing function of the printer indicated by the printer information received in step S503. The printer search unit 201 of the print plug-in 200 refers to the validating setting 821 of the printer stored in the print plug-in setting 300, and notifies the control unit 102 of the result.

In step S903, the control unit 102 determines whether or not the standard printing function of the printer is valid based on the validating setting about which notification has been provided by the printer search unit 201 of the print plug-in 200 in step S902. If it is determined in step S903 that the standard printing function is valid, the process proceeds to step S504, and the control unit 102 registers the printer information received in step S503 in the detected printer list 700.

In contrast, if it is determined in step S903 that the standard printing function is invalid, the process proceeds to step S507 without registering the printer information received in step S503 in the detected printer list 700. That is, the printer in which the standard printing function is invalid is not displayed on the target printer display region 403 in FIG. 5B or the printer list screen 408 in FIG. 6B as the detected result of the standard printer search unit 106.

Note that as the detected result of the printer search unit 201 of the print plug-in 200, the printer is displayed on the target printer display region 403 in FIG. 5B and the printer list screen 408 in FIG. 6B. In other words, a printer in which the standard print function has been invalidated is not to be used as a printer corresponding to the standard search protocol, but is to be used as a printer corresponding to the search protocol of the print plug-in.

Third Embodiment

Differences in printing results may occur in the same printer between printing using the print plug-in 200 and printing using the standard printing function of the printing system 100 due to the different printing processing units. In such a case, it is conceivable that a user who prefers the printing result of the standard printing function continues to use the standard printing function.

However, in this case, it is not possible to use the extension function of the print plug-in 200 provided by the vendor. Accordingly, in the present embodiment, the print plug-in 200 uses the printing function of the standard printing unit 107, thereby allowing the use of the extending function of the print plug-in as well while using the standard printing function for the generation of the printing data.

Figure 13:
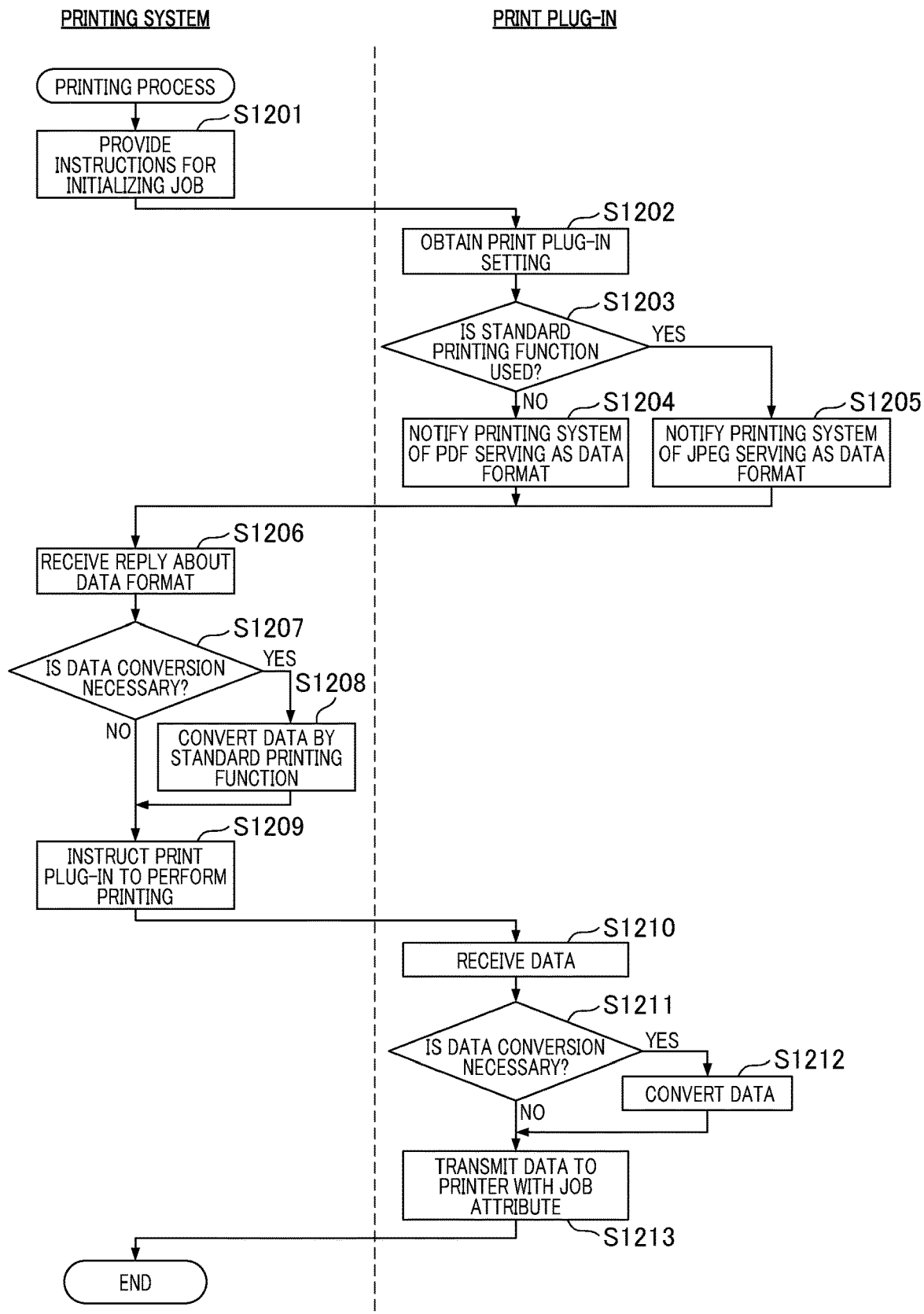
FIG. 13 is a sequence diagram illustrating an operation if instructions for printing execution are provided.

FIG. 13 is a sequence diagram illustrating an example of the operation of the printing system 100 and the print plug-in 200 after the printing button 405 in FIG. 5B has been tapped. The process illustrated in FIG. 13 is realized by loading the program stored in the flash memory 2003 into the RAM 2002 and executing it by the SoC 2001.

In the present embodiment, it is assumed that the print plug-in 200, which supports the printer displayed on the target printer display region 403 that has been selected as a target to be printed in FIG. 5B, has already been installed in the mobile terminal device 2000. When the printing button 405 is tapped in FIG. 5B, the process in FIG. 13 starts. In step S1201, the control unit 102 of the printing system 100 instructs the printing processing unit 202 of the print plug-in 200 to initialize the print job.

In step S1202, the printing processing unit 202 of the print plug-in 200 obtains the setting contents of the validating setting 821 of the standard printing function of the print plug-in setting 300 (FIG. 3) stored in the flash memory 2003. In step S1203, the printing processing unit 202 refers to the print plug-in setting 300 obtained in step S1202 and determines whether or not the standard printing function is valid.

If it is determined in step S1203 that the standard printing function is invalid, the process proceeds to step S1204. If it is determined in step S1203 that the standard printing function is valid, the process proceeds to step S1205. Note that in the determination in step S1203, although the printing processing unit 202 refers to the validating setting 821 of the standard printing function stored in the print plug-in setting 300, the present invention is not limited thereto. For example, the settings for validation or invalidation of the standard printing function may be displayed on the printing setting region 404 in FIG. 5B and may be set for each execution of printing, that is, for each print job.

In step S1204, the printing processing unit 202 notifies the control unit 102 of the printing system 100 that "PDF" servers as the data format of the print job. In step S1205, the printing processing unit 202 notifies the control unit 102 of the printing system 100 that "JPEG" serves as the data format of the print job.

In step S1206, the control unit 102 of the printing system 100 receives information about the data format of the print job for which notification has been provided by the printing processing unit 202 of the print plug-in 200. In step S1207, the control unit 102 refers to the information about the data format of the print job received in step S1206 and determines whether or not data conversion is necessary. In the present embodiment, the format of data transmitted from the application 112 to the printing system 100 during printing is PDF format.

If the information about the data format received in step S1206 is other than the PDF format, it is determined that data conversion is necessary, and the process proceeds to step S1208. If it is determined that data conversion is not necessary, the process proceeds to step S1209. In step S1208, the standard printing unit 107 of the printing system 100 rasterizes the PDF format data transmitted from the application 112, and then converts it into the JPEG format.

Specifically, in step S1204, the printing processing unit 202 notifies the control unit 102 of the data format to request the printing system 100 to perform data conversion, in other words, to generate printing data. Note that, in the present embodiment, an example of the conversion to the JPEG format is described. However, the present invention is not limited thereto, and the conversion to any format may be allowed.

In step S1209, the control unit 102 instructs the printing processing unit 202 of the print plug-in 200 to perform printing. At this time, the control unit 102 transmits information about the data format of the printing data together with the printing data to the printing processing unit 202. More specifically, if it is determined in step S1207 that data conversion is necessary, the printing data for which the data format is converted in step S1208 is transmitted to the printing processing unit 202.

In contrast, if it is determined in step S1207 that the data conversion is not necessary, the PDF format data is transmitted from the application 112 as printing data to the printing processing unit 202. In step S1210, the printing processing unit 202 of the print plug-in 200 receives the printing data and the information about the data format of the printing data that has been transmitted from the control unit 102 of the printing system 100.

In step S1211, the printing processing unit 202 determines whether or not the data conversion is necessary based on the information about the data format of the printing data received in step S1210. If the validating setting 821 (FIGS. 11A to 11C) of the standard printing function of the printer selected as a printer to be used, in other words, the printer shown in the target printer display region 403 in FIG. 5B is set to "ON", the printing processing unit 202 receives printing data in JPEG format in step S1210. Hence, it is determined in step S1211 that the data conversion is unnecessary, and the process proceeds to step S1213.

In contrast, if the validating setting 821 of the standard printing function of the printer selected as a printer to be used, in other words, the printer shown in the target printer display region 403 in FIG. 5B, is set to "OFF", the printing processing unit 202 receives printing data in PDF format in step S1210. Hence, it is determined in step S1211 that data conversion is necessary, and the process proceeds to step S1212.

In step S1212, after rasterizing the data in PDF format received in step S1210, the printing processing unit 202 of the print plug-in 200 converts the data into JPEG format. In step S1213, the printing processing unit 202 transmits the printing data to the printer to be used together with the job attribute in which the setting values set in the printing setting region 404 in FIG. 5B is applied, and ends the process.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-012337, filed Jan. 26, 2017, which is hereby incorporated by reference wherein in its entirety.

What is claimed is:

1. An information processing apparatus, comprising:
a controller comprising a memory storing instructions; and
a processor which is capable of executing the instructions, the controller configure to:
search for a printer;
determine whether the printer detected by the searching conforms to print data to be generated by first predetermined software conforming to Internet Printing Protocol;
send, without downloading the first predetermined software, print data generated by the first predetermined software to a first printer, which has been detected by the searching and determined to conform to the print data to be generated by the first predetermined software; and
facilitate downloading of second predetermined software for generating print data to be sent to a second printer, which has been detected by the searching and determined not to conform to the print data to be generated by the first predetermined printer.

2. The information processing apparatus according to claim 1, the controller further configured to:
display a first name of the detected first printer and a second name of the detected second printer; and
send, according to the Internet Printing Protocol, the print data generated by the first predetermined software to the detected first printer in a case that the first name has been selected;

facilitate downloading the second predetermined software in a case that the second name has been selected.

3. The information processing apparatus according to claim 1, wherein the controller is further configured to display an object to be pushed for downloading the second predetermined software for facilitating downloading of the second predetermined software.

4. The information processing apparatus according to claim 1, wherein the generated first print job are executed by a default function the first predetermined software is default software of an operation system of the information processing apparatus.

5. The information processing apparatus according to claim 1, wherein the second predetermined software is able to search for a printer.

6. The information processing apparatus according to claim 1, the controller further configured to determine whether the second predetermined software is in a server, wherein the process is performed and facilitate downloading of the second predetermined software in a case that the second predetermined software is determined to be in the server.

7. A method for an information processing apparatus, comprising:
searching for a printer;
determining whether the printer detected by the searching conforms to print data to be generated by first predetermined software conforming to Internet Printing Protocol;
sending, without downloading the first predetermined software, print data generated by the first predetermined software to a first printer, which has been detected by the searching and determined to conform to the print data generated by the first predetermined printer; and
facilitating downloading of second predetermined software to be used for sending print data to a second printer, wherein the second printer has been detected by the searching and determined not to conform to the print data to be generated by the first predetermined printer.

8. The method for an information processing apparatus according to claim 7, further comprising:
displaying a first name of the detected first printer and a second name of the detected second printer;
sending, according to the Internet Printing Protocol, print data generated by the first predetermined software to the detected first printer in a case that the first name has been selected; and
for facilitating downloading the second predetermined software in a case that the second name has been selected.

9. The method for an information processing apparatus according to claim 7, further comprising:
displaying an object to be pushed for downloading the second predetermined software for facilitating downloading of the second predetermined software.

10. The method for an information processing apparatus according to claim 7, wherein the first predetermined software is default software of an operation system of the information processing apparatus.

11. The method for an information processing apparatus according to claim 7, wherein the second predetermined software is able to search for a printer.

12. The method for an information processing apparatus according to claim 11, wherein the second predetermined software is able to search for a printer not conforming to the first predetermined software.

13. The method for an information processing apparatus according to claim 7, further comprising determining whether the second predetermined software is in a server, and facilitating downloading of the second predetermined software in a case that the second predetermined software is determined to be in the server.

14. An information processing apparatus, comprising:
a controller comprising a processor and a memory, the controller configure to:
search for a printer;
select a printer from among detected printers by the searching;
based on a selection of a first printer, from among the detected printers, to which the information processing apparatus sends print data to be generated by first predetermined software conforming to Internet Printing Protocol, set information of the selected first printer without downloading the first predetermined software;
based on a selection of a second printer, from among the detected printers, to which the information processing apparatus sends print data generated by second predetermined software not conforming to Internet Printing Protocol, facilitate downloading of the second predetermined software and then set information of the selected second printer.

15. The information processing apparatus according to claim 14, wherein the controller is configured to:
displaying a first name of the first printer and a second name of the second printer;
based on a selection of the first name, from among the detected printers, to which the information processing apparatus sends the print data to be generated by the first predetermined software conforming to Internet Printing Protocol, set the information of the selected first printer without downloading the first predetermined software;
based on a selection of the second name, from among the detected printers, to which the information processing apparatus sends the print data generated by the second predetermined software not conforming to Internet Printing Protocol, facilitate downloading of the second predetermined software and then set the information of the selected second printer.

16. The information processing apparatus according to claim 14, wherein the controller is configured to:
display an object with the second name for facilitating downloading of the second predetermined software;
display a download page for downloading the second predetermined software based on a selection of the object.

17. The information processing apparatus according to claim 14, wherein the controller is configured to:
facilitate downloading of the second predetermined software in a case that the second predetermined software is in a server.

18. The information processing apparatus according to claim 14, wherein the second predetermined software is able to search for a printer.

19. The information processing apparatus according to claim 14, wherein set the information of the selected first printer regardless of whether or not the first printer conforms to the print data to be generated by the second predetermined software if the first printer conforms to the first predetermined software.

20. The information processing apparatus according to claim 15, wherein the information processing apparatus has been stored the first predetermined software in advance.

* * * * *